April 26, 1966 M. J. LANIGAN ETAL 3,248,565

DIGITAL INFORMATION STORAGE APPARATUS

Filed Feb. 19, 1963

Inventors
Michael John Lanigan
David Beverly George Edwards

United States Patent Office 3,248,565

Patented Apr. 26, 1966

3,248,565

DIGITAL INFORMATION STORAGE APPARATUS

Michael John Lanigan, Chorlton-cum-Hardy, Manchester, and David Beverley George Edwards, Gatley, Cheadle, England, assignors to National Research Development Corporation, London, England, a corporation of Great Britain Filed Feb. 19, 1963, Ser. No. 259,488
Claims priority, application Great Britain, Feb. 20, 1962, 6,633/62
7 Claims. (Cl. 307—88.5)

Figures 1, 2, 3:
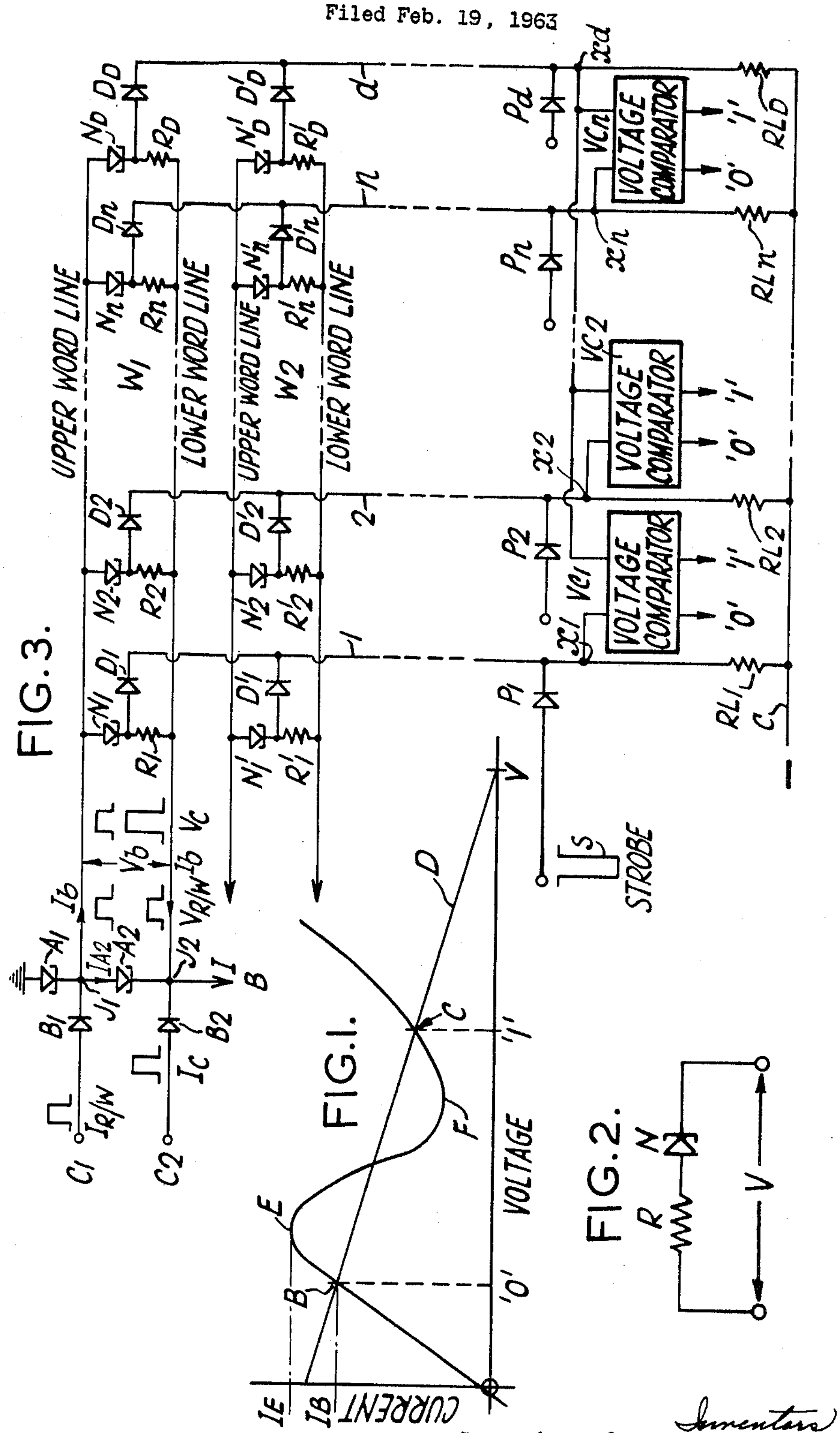

This invention relates to electronic digital information storage apparatus for storing information in the binary mode.

The invention utilises tunnel diodes. The characteristics of these diodes are illustrated by the curve A in FIG. 1 of the accompanying drawings, where it can be seen that they have a region of negative differential impedance in the forward direction. If, therefore, such a tunnel diode, indicated by the reference N in FIG. 2, is connected in series with a load resistor R, and a voltage V is applied across the combination there will be two different stable states for the combination which are indicated by the points B and C in FIG. 1 where the load line D of slope determined by the value of resistor R cuts the curve 1. It will be appreciated that these two stable states can be arranged to indicate the storage of one or other of the binary digits "0" and "1" and accordingly the combination can be used as a binary digit storage element.

It is an object of the invention to provide apparatus utilising such storage elements.

According to the invention electronic digital information storage apparatus comprises a pair of lines between which in operation a potential difference is maintained, a plurality of storage elements connected in parallel between the lines, each element comprising a tunnel diode in series with load resistance and capable of having two alternative stable values of voltage thereacross corresponding to two different stored digits (e.g. a "0" or "1"), individual connections to each element, writing means for each element comprising means for applying a current pulse of greater than a predetermined value to the associated connection to ensure that the greater value of voltage flows is maintained across the tunnel diode of the element when the writing current pulse is removed and reading means for each element comprising means for determining which of the two possible values of voltage exists across the associated tunnel diode.

In carrying out the invention isolating diodes are included in each of said connections across which a reverse bias is normally applied. This reverse bias is removed from a selected connection for reading and writing, when a current pulse is caused to flow through the connection. For reading this pulse is arranged to be less than the current $I_E—I_B$ in FIG. 1 and hence cannot change the state of the element. For writing this pulse is arranged to be greater than the current $I_E—I_B$ so that on cessation of the pulse the element has been transferred to its other stable state.

For convenience in determining the state of an element when reading, an additional storage element can be provided between the pair of lines which additional element is arranged to remain always in the same stable state and a comparator can be provided which compares the voltage appearing on the connection to said additional storage element with the voltage appearing on the connection to the storage element being read.

The invention also provides multiword digital information storage apparatus comprising a plurality of pairs of word lines across each of which pairs there is connected in parallel a plurality of storage elements. With such an arrangement word selection means for both reading and writing can, comprise means for temporarily changing the potentials of a selected pair of word lines in unison.

To erase information the potential difference between the pair of lines can be temporarily reduced to ensure that the value of the voltages across all of the diodes connected between the pair of lines is the lesser stable value.

An embodiment of the invention will now be described with reference to FIG. 3 of the accompanying drawings.

FIG. 3 illustrates an embodiment in circuit diagrammatic form. The circuit can have one or more pairs of lines each providing for the storage of a different digital word. Two such pairs of lines are illustrated in the diagram and are referenced $W_1$ and $W_2$ respectively. The two lines of a pair can conveniently be designated as the Upper Word Line and Lower Word Line. Between each pair of lines there is connected a plurality of storage elements in parallel with each other. A storage element consists of a tunnel diode in series with a resistor and as has been explained, with reference to FIGS. 1 and 2, when a suitable potential difference is applied between the word lines, two alternative stable values of voltage can exist across a tunnel diode. In the diagram the pair of lines designated $W_1$ is shown as having a first storage element comprising components tunnel diode $N_1$ and resistor $R_1$, a second storage element comprising tunnel diode $N_2$ and resistor $R_2$ and an $n$th storage element comprising tunnel diode $N_n$ and resistor $R_n$. Of course integer $n$ can have any desired value corresponding to the number of binary digits contained in a stored word. The second pair of lines $W_2$ is identical with the pair $W_1$ and like components have like references with a dash (′) added.

In addition to the storage elements described so far each pair of lines can be provided with an additional or "dummy" storage element. The additional storage element for pair $W_1$ comprises a tunnel diode $N_D$ in series with a resistor $R_D$ and in like manner the additional storage element for pair $W_2$ comprises tunnel diode $N'_D$ in series with resistor $R'_D$.

Individual connections to the junctions between the tunnel diodes and the resistors of the storage elements are made through isolating diodes designated $D_1$, $D_2$ . . . $D_n$ in the first pair of lines, and $D'_1$, $D'_2$ . . . $D'_n$ in the second pair of lines. These diodes in turn are connected to digit lines each associated with different digit positions and common to all of the words. The digit lines are designated 1, 2 . . . $n$ in accordance with their associated digits. Digit line 1 has a load resistor $RL_1$, digit line 2 has a load resistor $RL_2$, and similarly digit line $n$ has a load resistor $RL_n$. In addition, as additional or "dummy" digit line $d$ is provided which is connected through separate diodes $D_D$, $D'_D$ to the additional storage elements of each word, and digit line $d$ has a common load resistor $RL_D$. The load resistors $RL_1$, $RL_2$ . . . $RL_n$, $RL_D$ are all connected to a common negative line C.

Voltage comparators $VC_1$, $VC_2$ . . . $VC_n$ are provided for each digit line, the two inputs of which are respectively connected to the load resistors $RL_1$, $RL_2$ . . . $RL_n$ of different digit positions, while the other input to each of the voltage comparators is connected in common to the load resistor $RL_D$ of the dummy digit line $d$. Separate read/write input connections are made to each digit line through isolating diodes $P_1$, $P_2$ . . . $P_n$ associated with each digit line. There is also an input connection to dummy digit line $d$ through an isolating diode $P_D$.

When the apparatus is storing information each of the storage elements will have either a greater or lesser value of voltage across them depending on the information written in a manner to be described. In the following description it is assumed that the lesser voltage across a tunnel diode corresponds to the binary digit "0" and the greater voltage across a tunnel diode corresponds to the binary digit "1," although the opposite convention can equally well be used if desired.

To read information present in the apparatus the potentials of both the Upper and Lower Word Line of a selected word are raised in unison by equal amounts by means of voltage pulses designated $V_{R/W}$ on the selected lines. This achieve selection of a desired word. To read the information in any digit of the selected word the digit line of that digit is pulsed by means of a negative strobe S applied to the line through its input connections. The effect of raising the potential of a pair of word lines in unison will be to leave unchanged the potential difference between the word lines and thus not alter the pattern of information stored in the selected word. However, the combination of raising the potentials of a pair of lines and at the same time operating the strobe S of a digit line will be to remove the reverse bias from the isolating diode connected between that digit and the selected pair of word lines and cause current to flow through the erstwhile isolating diode and tunnel diode. The magnitude of the read current is however insufficient to draw enough additional current through a tunnel diode to change its state from "0" to "1." This ensures that nondestructive reading is obtained. Thus if, for example, the digit line 1 is pulsed by means of strobe S and the pair of word lines $W_1$ has pulse $V_{R/W}$ applied thereto current will flow through diode $D_1$ and load resistor $RL_1$. However, the value of this current in the case of a reading operation is constant and less than $(I_E-I_B)$ in FIG. 1. This current will produce a voltage level corresponding to the state of the stored digit at $x_1$ (FIG. 3).

While direct measurement of this voltage can be used to indicate the value of the digit stored a more convenient method is to compared this voltage produced at $x_d$ of the dummy digit line by applying a strobe to the input to the common digit line *d* at the same time. The additional storage elements are always arranged to be in the "0" state and thus a voltage will be produced at $x_d$ which will always be of the same value and will correspond to the value of voltage across any of the other load resistors when a "0" is stored in the associated storage element. Thus if the two voltage inputs to voltage comparator $VC_1$ are equal this indicates the presence of a "0" in the storage element, while if they are different a "1" is indicated. Accordingly any selected digit in the store can be read, word selection being achieved by the pulses $V_{R/W}$ to selected word pairs of lines and digit selection being achieved by the pulses S to a selected digit line. In general all digit lines will be selected at the same time to achieve parallel read out of the selected word.

To write information into a selected digit of the store a similar procedure is effected namely, the word of which the selected digit is part is selected by means of applying the read/write pulse $V_{R/W}$ while a strobe S is applied to the input to the digit line of that digit. In addition, the potential of the common line C is temporarily made more negative and the combined effect of this reduction in potential of the strobe S on a selected digit line is to cause a current to flow through the selected storage element which is greater than the value $I_E-I_B$ and if this storage element is in the "0" state the write current is of sufficient magnitude to ensure that the current that flows is such as to temporarily take the working point on the tunnel diode characteristics over its "hump" E (FIG. 1). Thus on removal of the strobe S the subsequent value of voltage across the tunnel diode will be the greater value corresponding to the digit "1." By this means the digit "1" can be written into any desired position and the positions to which no writing strobe has been applied will remain in the "0" state.

When it is desired to clear or erase information in any word one possible arrangement is to apply pulses $V_C$ in unison to the pairs of lines constituting that word. These pulses serve to reduce the potential difference between the selected pair of lines and thus reduce the voltage across any tunnel diode in the "1" state to less than the voltage of "hump" F (FIG. 1). On removal of the pulses $V_C$ from the word lines all the storage elements of the word will be reduced to the "0" state.

A convenient arrangement for producing the read/write pulse $V_{R/W}$ and the clear pulse $V_C$ is illustrated in FIG. 3. This arrangement comprises two tunnel diodes $A_1$ and $A_2$ connected in series between a point at earth potential and a negative current source B so as to cause a current I to flow through the potential divider circuit formed by tunnel diodes $A_1$ and $A_2$ and the memory elements of the associated word. In practice $A_1$ and $A_2$ can each consist of two or more tunnel diodes in series or Zener diodes may be employed. The Upper Word Line is connected to the junction $J_1$ between tunnel diodes $A_1$ and $A_2$, while the Lower Word Line is connected to the junction $J_2$ between tunnel diode $A_2$ and the current source B. Accordingly the potential difference between the two word lines will depend on the state of tunnel diode $A_2$ while the absolute potential of the pair of word lines depends on the state of the tunnel diode $A_1$. One input control connection $C_1$ is made to junction $J_1$ through an isolating diode $B_1$ and another input control connection $C_2$ is made to junction $J_2$ through an isolating diode $B_2$.

In normal operation of the apparatus current flows through tunnel diodes $A_1$ and $A_2$ between earth and current source B of value sufficient to ensure an appreciable voltage across the diodes, which may be said to be in the "1" state. To produce the read/write pulse $V_{R/W}$ a current pulse $I_{R/W}$ is applied to connection $C_1$. This current flows through diode $A_2$ and the memory elements of the associated word to current source B and the resultant voltage across $A_2$ is virtually unchanged. However, the current now flowing through diode $A_2$ is derived from connection $C_1$ and not from tunnel diode $A_1$ and accordingly the current through the latter diode $A_1$ is reduced sufficiently (or even reversed) to ensure that diode $A_1$ is in the "0" state and the voltage across that diode becomes very small. Accordingly the potential of both the Upper Word Line and the Lower Word Line is raised towards earth by equal amounts. On removal of the current pulse $I_{R/W}$ the potentials of the two lines return to their initial more negative values.

To produce the clear pulse $V_C$ on the word lines a current pulse $I_C$ is applied to connection $C_2$. This has the effect of replacing the current flowing through both tunnel diodes $A_1$ and $A_2$ and since the current through these tunnel diodes is much reduced or even reversed both the Upper Word Line and the Lower Word Line are taken to effectively earth potential and accordingly there is practically no potential difference between them for the duration of the pulse $I_C$.

It will be appreciated that similar input circuits are provided for each of the pairs of word lines and any conventional diode matrix can be provided to produce pulses $I_{R/W}$ or pulses $I_C$ at a selected word. Alternatively these pulses can be fed from transformers using well known circuit arrangements, or by use of a transistor matrix.

We claim:

1. Electronic digital information storage apparatus comprising a pair of lines between which in operation a potential difference is maintained, a plurality of storage elements each connected between the said pair of lines, each element comprising a tunnel diode in series with load resistance and said tunnel diodes being capable of having two alternative stable values of voltage thereacross corresponding to two different stored digits (e.g. a "0" or "1"), individual connections to the junction between the tunnel diode and load resistance of each element, each of said connections including a normally reverse-biased isolating diode, writing means for each element comprising means for applying a current pulse of greater than a predetermined value through the connection thereto to remove the reverse bias from the isolating diode and ensure that the greater stable value of voltage is maintained across the tunnel diode of the element when the writing current pulse is removed, and reading means for each element comprising means for supplying a current pulse of less than a predetermined value through the connection thereto to remove the reverse bias from the isolating diode and means for determining which of the two possible values of voltage exists across the associated tunnel diode.

2. Apparatus as claimed in claim 1 in which the means for determining which of the two possible values of a voltage exists across a tunnel diode comprises an additional storage element provided between the pair of lines which additional element is arranged to remain in the same stable state and in which a comparator is provided which compares the voltage appearing on the connection to said additional storage element with the voltage appearing on the connection to the storage element being read.

3. Electronic digital information storage apparatus comprising a plurality of pairs of word lines between which in operation a potential difference is maintained, a plurality of storage elements connected in parallel between each of said pairs of word lines, each element comprising a tunnel diode in series with load resistance and said tunnel diodes being capable of having two alternative stable values of voltage thereacross corresponding to two different stored digits (e.g. a "0" or "1"), individual reverse biased isolating diodes connected to the junction between the tunnel diode and load resistance of each element, an array of digit lines each digit line being connected to a plurality of isolating diodes each connected to a storage element between a different pair of word lines, selection means for selecting any one of said pairs of word lines for both reading and writing, said selection means comprising means for temporarily changing the potentials of a selected pair of word lines in unison while maintaining the potential difference between the selected pair of word lines reasonably constant, writing means comprising means for applying a current pulse of greater than a predetermined value through a digit line to remove the reverse bias from the isolating diode connected to the selected pair of word lines and thereby ensure that the greater stable value of voltage is maintained across the tunnel diode of the selected element when the writing current pulse is removed, and reading means comprising means for applying a current pulse of less than a predetermined value through a digit line to remove the reverse bias from the isolating diode connected to the selected pair of word lines, and means for measuring the voltage of a digit line resulting from the removal of said reverse bias.

4. Apparatus as claimed in claim 3 in which means are provided for erasing information stored in the storage elements of a selected pair of word lines, said erasing means comprising means for reducing the potential difference between said pair of lines sufficiently to ensure that the magnitude of the voltage across all the diodes connected between said pair of lines is the lesser value of the two stable values.

5. Apparatus as claimed in claim 4 in which the potential difference between each pair of word lines is in operation maintained by a current path between the lines of a pair which path includes at least one diode selected from the class of tunnel diodes and Zener diodes and said erasing means comprises means for momentarily interrupting current flow through said path.

6. Apparatus as claimed in claim 5 in which a current path is provided between one of each pair of word lines and a point of fixed potential which path includes at least one diode selected from the class of tunnel diodes and Zener diodes and the selection means for reading and writing comprises means for momentarily interrupting current flow through said path.

7. Apparatus as claimed in claim 6 in which current is arranged to flow through said two paths in series and in which said selection means comprises means for applying a current pulse to the line of a selected pair nearer in potential to the point of fixed potential which pulse maintains current flow through the path between the lines of the selected pair but prevents substantial current flow through the path to the point of fixed potential and in which the erasing means comprises means for applying a current pulse to the line of a selected pair further in potential from the point of fixed potential which pulse prevents substantial current flow through both paths associated with a selected pair of word lines.

References Cited by the Examiner

UNITED STATES PATENTS

| | | | |
|---|---|---|---|
| 3,107,345 | 10/1963 | Groudis | 307—88.5 |
| 3,141,097 | 7/1964 | Grubb | 307—88.5 |

References Cited by the Applicant

UNITED STATES PATENTS

| | | |
|---|---|---|
| 3,206,730 | 9/1965 | Garash. |

DAVID J. GALVIN, *Primary Examiner.*

ARTHUR GAUSS, *Examiner.*